United States Patent [19]

DiGiovanni et al.

[11] Patent Number: 5,237,637
[45] Date of Patent: Aug. 17, 1993

[54] RESONANTLY ENHANCED OPTICAL SECOND HARMONIC GENERATOR

[75] Inventors: David J. DiGiovanni, Scotch Plains; Denise M. Krol, Murray Hill; Chandra M. Varma, Summit, all of N.J.

[73] Assignee: AT&T Bell Laboratories, Murray Hill, N.J.

[21] Appl. No.: 905,924

[22] Filed: Jun. 29, 1992

[51] Int. Cl.$^5$ .......................... H01S 3/10; H03F 7/00; G02B 6/02
[52] U.S. Cl. ..................................... 385/122; 385/123; 385/141; 372/22; 359/326; 359/328; 359/332
[58] Field of Search ............... 385/122, 123, 129, 130, 385/131, 132, 141, 142, 147; 372/5, 6, 12, 20, 21, 22, 68; 359/326, 328, 332

[56] References Cited

U.S. PATENT DOCUMENTS

| 4,666,247 | 5/1987 | MacChesney | 65/3.12 |
|---|---|---|---|
| 4,809,291 | 2/1989 | Byer et al. | 372/22 X |
| 4,856,006 | 8/1989 | Yano et al. | 372/22 |
| 4,867,510 | 9/1989 | Dobson | 372/22 X |
| 4,910,737 | 3/1990 | Payne et al. | 372/6 |
| 4,951,293 | 8/1990 | Yamamoto et al. | 372/22 X |
| 5,042,039 | 8/1991 | Edagawa et al. | 385/141 X |
| 5,123,940 | 6/1992 | DiGiovanni | 65/3.12 |
| 5,131,069 | 7/1992 | Hall et al. | 385/141 X |
| 5,150,252 | 9/1992 | Furukawa et al. | 372/22 X |
| 5,151,817 | 9/1992 | Krol et al. | 385/122 X |
| 5,168,503 | 12/1992 | Maeda | 372/22 |
| 5,189,722 | 2/1993 | Chikuma | 385/122 |
| 5,191,630 | 3/1993 | Tajima | 385/122 |

OTHER PUBLICATIONS

T. J. Driscoll, et al. "Observation Of Frequency Doubling In Tantalum Doped Silica Fibres", *Electronics Letters*, vol. 27, No. 22, pp. 2088-2090 (1991).
R. H. Stolen, "Nonlinear Waves in Solid State Physics", A. D. Boardman, T. Twardowski and M. Bertolotti, eds. (Plenum, New York, 1990).
S. E. Miller and I. P. Kaminow *Optical Fiber Telecommunications II*, Academic Press, pp. 334 et seq.
B. Ya, et al. "Interference of fields with frequencies omega and 2 omega in external photoelectric effect" *JETP Letters*, vol. 50, No. 10, pp. 439-441 (1989).
A. S. L. Gomes et al. "Amplified spontaneous emission in $Tm^{3+}$-doped monomode optical fibers in the visible region", *Appl. Phys. Lett.*, vol. 57, pp. 2169-2171.
T. J. Driscol, et al. "Observation of Frequency Doubling in Tantalum Doped Silica Fibres", *Electronic Letters*, vol. 27, No. 22, pp. 2088-2090, (1991).
M. E. Fermann, et al. "Frequency-Doubling By Modal Phase Matching In Poled Optical Fibres", *Electronic Letters*, vol. 24, No. 14, pp. 894-895 (1988).
U. Osterberg, et al. "Dye laser pumped by Nd:YAG laser pulses frequency doubled in a glass optical fiber", *Optics Letters*, vol. 11, No. 8, pp. 516-518 (1986).
H. Rajbenbach, et al. "Near-infrared four-wave mixing with gain and self-starting oscillators with photorefractive GaAs", *Optics Letters*, vol. 14, No. 1, pp. 78-80 (1989).
D. M. Krol et al. "Photoinduced second-harmonic generation in rare-earth-doped aluminosilicate optical fibers", *Optics Letters*, vol. 16, No. 21, pp. 1650-1652 (1991).
I. C. S. Carvalho, et al. "Preparation of frequency-doubling fibers under UV excitation", *Optics Letters*, vol. 16, No. 19, pp. 1487-1489 (1991).

(List continued on next page.)

Primary Examiner—Brian Healy
Attorney, Agent, or Firm—Glen E. Books

[57] ABSTRACT

Applicants have discovered that the conversion efficiency of doped glass optical second harmonic generators can be enhanced when the frequency $\omega$ of the fundamental beam or the frequency $2\omega$ of the harmonic beam is chosen near the resonance frequency of an optical transition in the dopant. This resonant enhancement is demonstrated for Tm doped aluminosilicate glass fibers where tuning of the fundamental writing beam to a resonance frequency enhances the second harmonic output by a factor of $10^3$.

8 Claims, 2 Drawing Sheets

OTHER PUBLICATIONS

M. E. Fermann, et al. "Second-harmonic generation using gratings optically written by mode interference in poled optical fibers", *Optics Letters*, vol. 14, No. 14, pp. 748-750 (1989).

D. Z. Anderson, et al. "Model for second-harmonic generation in glass optical fibers based on asymmetric photoelectron emission from defect sites", *Optics Letters*, vol. 16, No. 11, pp. 796-798 (1991).

R. H. Stolen et al. "Self-organized phase-matched harmonic generation in optical fibers", *Optics Letters*, vol. 12, No. 8, pp. 585-587 (1987).

E. M. Dianov, et al. "Problem of the photoinduced second harmonic generation in optical fibers", *Sov. J. Quantum Electron*, vol. 19, pp. 575-576 (1989).

E. V. Anoikin et al, "Photoinduced second-harmonic generation in gamma-ray-irradiated optical fibers", *Optics Letters*, vol. 15, pp. 834-835 (1990).

E. Snitzer, 148 *Journal of the Less Common Metals*, pp. 45-58 at pp. 55-57 (1989).

N. B. Baranova et al, "Extension of holography to multifrequency fields" *JETP Lett.*, vol. 45, pp. 717-719 (1987).

RESONANTLY ENHANCED OPTICAL SECOND HARMONIC GENERATOR

FIELD OF THE INVENTION

This invention relates to a second harmonic generator and, in particular, to a glass optical frequency second harmonic generator wherein harmonic output is resonantly enhanced.

BACKGROUND OF THE INVENTION

There is considerable interest in photo-induced second harmonic generation for use in light sources. The phenomenon of second harmonic generation, which essentially doubles the frequency $\omega$ of an input beam, is useful in a frequency doubled light source ($2\omega$). Higher frequency light not only can carry more information but also can be used to store and read information in correspondingly higher densities.

Photo-induced second harmonic generation has been observed in glass optical waveguides doped with certain materials, including germanium-doped fibers and erbium doped fibers. The fiber is initially conditioned by simultaneous exposure to a fundamental beam at $\omega$ and a second harmonic beam at $2\omega$. This conditioning process induces a permanent periodic modification of the glass resulting in an $\chi^{(2)}$ grating that is phase matched for second harmonic generation of light at $2\omega$. After conditioning, input of light at $\omega$ results in output at both $\omega$ and $2\omega$.

One shortcoming of photo-induced second harmonic generators is their relatively low conversion efficiencies. Reproducible efficiencies have been about $10^{-2}\%$ per watt or less, and higher efficiencies are desired.

SUMMARY OF THE INVENTION

Applicants have discovered that the conversion efficiency of doped glass optical second harmonic generators can be enhanced when the frequency $\omega$ of the fundamental beam or the frequency $2\omega$ of the harmonic beam is chosen near the resonance frequency of an optical transition in the dopant. This resonant enhancement is demonstrated for Tm doped aluminosilicate glass fibers where tuning of the fundamental writing beam to a resonance frequency enhances the second harmonic output by a factor of $10^3$.

BRIEF DESCRIPTION OF THE DRAWINGS

Referring to the drawings.

DETAILED DESCRIPTION OF THE INVENTION

Figure 1:
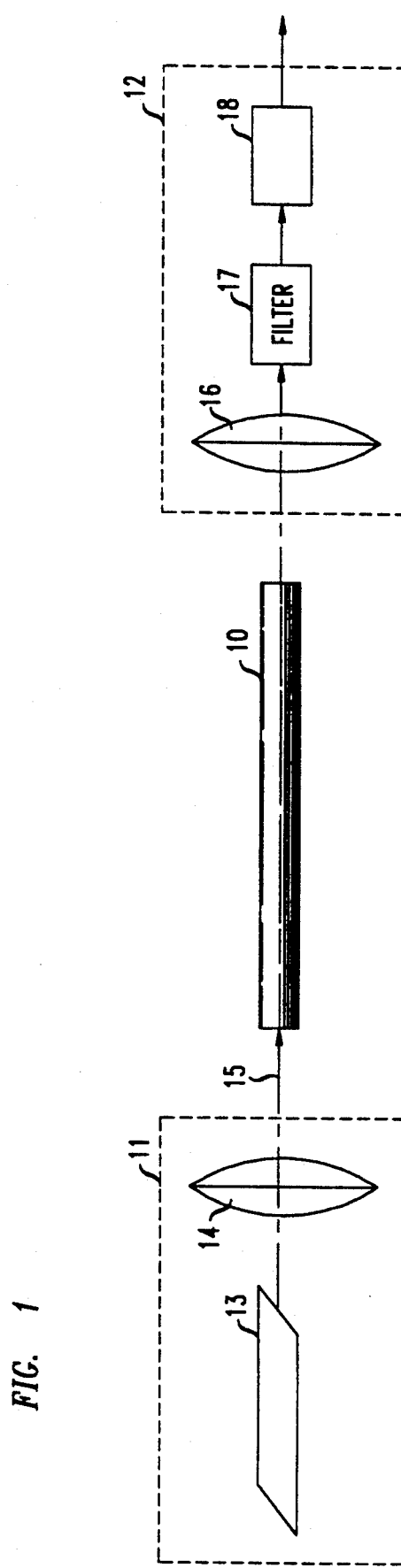
FIG. 1 illustrates in schematic cross section in a resonantly enhanced second harmonic generator in accordance with the invention.

In essence, the generator comprises a waveguiding body of doped glass 10 such as a waveguide or an optical fiber, an optical input source 10 for applying to the body an optical input beam at a first frequency $\omega$, such as a laser, and an output utilization means 12 for utilizing an output beam having a frequency $2\omega$ essentially twice the frequency of the input beam. The dopant can be any one of the dopants for producing second harmonic generation in glass including, but not limited to, germanium tantalum and the rare earths erbium, ytterbium, europium, cerium and thulium. In accordance with the invention either $\omega$ or $2\omega$ is chosen to be near the resonance frequency of an optical transition in the dopant. For low absorption dopants such as rare earths, the optical frequency is at the peak. However for high absorption materials the optical frequency will be near the peak but not necessarily at the peak. Specifically, $\omega$ or $2\omega$ is chosen to lie within twice the half-peak bandwidth of the resonance band and preferably within the half-peak bandwidth.

A method and apparatus for making single mode optical fibers doped with such material is described in U.S. Pat. No. 4,666,247, entitled "Multiconstituent Optical Fiber".

For a given dopant the optical transition resonance frequencies can be determined by measuring attenuation in a doped, single-mode fiber using the cutback technique described in *Optical Fiber Telecommunications II*, edited by S. E. Miller and I. P. Kaminow, Academic Press, pp. 334 et seq.

Preferably, the glass body 10 is a single mode optical fiber, the input source 11 comprises a semiconductor laser 13 and coupling means, such as a lens 14 for coupling a fundamental beam 15 of frequency $\omega$ into body 10. A utilization means 12 can comprise an output coupler such as lens 16, an optical filter means 17 for selectively removing light of frequency $\omega$, and a device 18 for utilizing light of frequency $2\omega$ such as an optical disk reader. In this arrangement the device 10 and 11 acts as a light source.

The fabrication and structure of the invention can be understood in greater detail by consideration of the following specific example. A thulium-doped, single mode fiber is made using the apparatus and technique described in U.S. Pat. No. 5,123,940 entitled "Sol-Gel Doping of Optical Fiber Performs". The fiber has a 4.2 micron diameter core of thulium-doped alumino-silicate glass surrounded by a cladding of silica. The difference in index of refraction, $\Delta N$, is 0.0072. The core is 3 mole % aluminum oxide and 97% silica. The Tm concentration estimated from optical absorption and preform preparation conditions is 4 ppm. The absorption spectrum of the fiber also shows the presence of 0.1 ppm of Er.

The fiber was cut to 35 cm lengths. The ends were stripped and cleaved, and the ends of each specimen were mounted in a brass fiber chuck consisting of a brass cylinder having a radial slit into which a fiber is placed. The chuck was then placed in an optical mount.

The optical input source was a mode-locked Ti-sapphire laser (Spectra-Physics Tsunami) with a 40 ps pulse width and an 82 MHz repetition rate. Part of the fundamental beam frequency was doubled in an LBO crystal. $\chi^{(2)}$ gratings were written by simultaneous irradiation with the fundamental and second harmonic beams at various wavelengths of the fundamental beam between 730 and 860 nm. Optimal conditioning time was about 5 hours. Typical average powers were 200 mW at the fundamental and 5 mW at the second harmonic. It should be noted 200 mW at the fundamental and 5 mW at the second harmonic. It should be noted that the use of higher powers in the conditioning step would produce higher conversion efficiencies. At each wavelength a new piece of fiber and similar average powers at the fundamental and second harmonic wavelengths were used.

Figure 2:
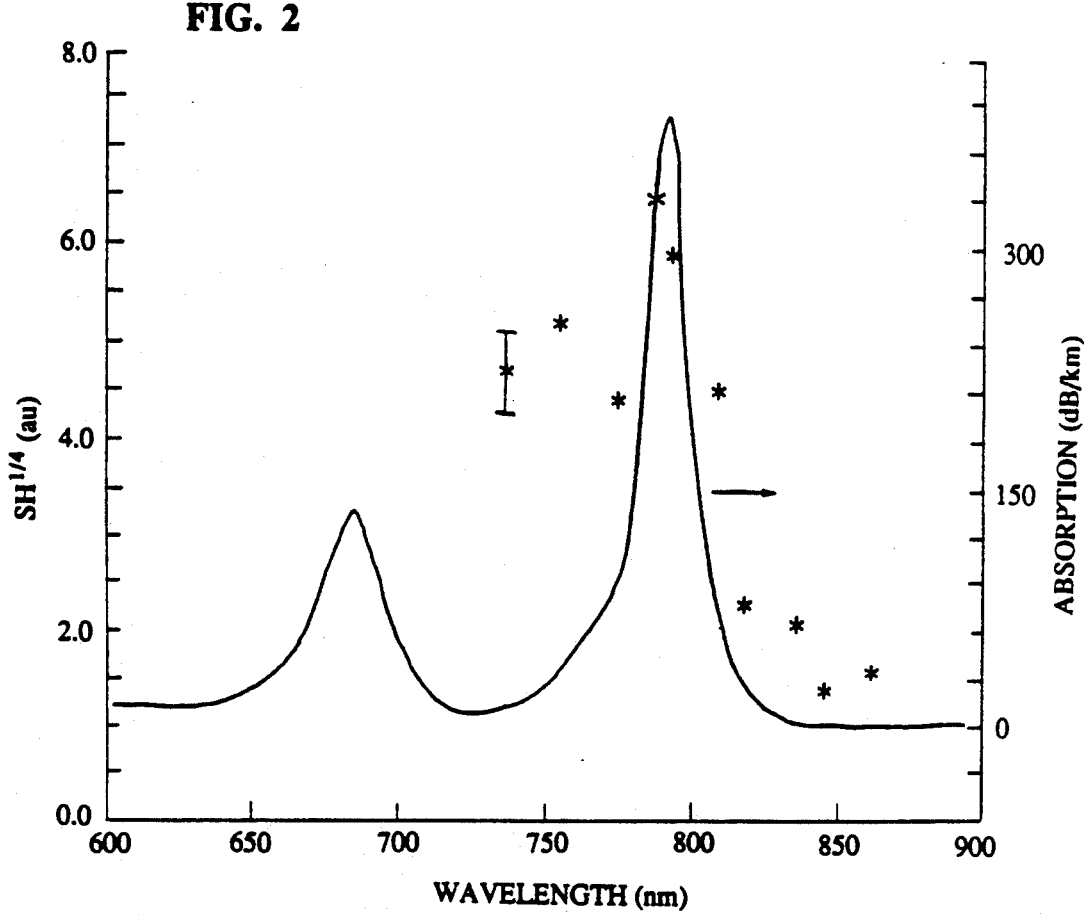
FIG. 2 is a graphical illustration showing, as points, the fourth root of the measured second harmonic intensity and, as a curve, the optical absorption spectrum of thulium near 785 nm.

The results showed that second harmonic generation intensity was dependent on the optical absorption resonances of thulium at 370 nm and 785 nm. FIG. 2 is a graphical illustration showing, as points, the fourth root of the measured second harmonic intensity and, as a curve, the optical absorption spectrum of thulium near 785 nm. The deviation between points an curve for $\lambda < 770$ nm is attributed to the fact that in this range there are two resonant contributions, one from the $^3H_6 \rightarrow ^3H_4$ transition in thulium at 785 nm (resonance at $\omega$) and one from the $^3H_6 \rightarrow ^1D_2$ transition at 370 nm (resonance at $2\omega$).

In order to ensure that the observed second harmonic generation was due to the thulium dopant and not some other defect in the glass, second harmonic generation was measured in an undoped aluminosilicate fiber and found to be $10^{-4}$ that of the doped fiber. The conclusion is that the induced second harmonic generation strongly increases when the wavelength of the fundamental beam or the harmonic beam is tuned to an optical absorption resonance of the dopant responsible for the formation of the $\chi^{(2)}$ grating.

In the formation of the induced $\chi^{(2)}$ grating the induced $\chi^{(2)}$ can be expressed as $\chi^{(2)} = a^2 \kappa E_\omega^2 E_{2\omega}$ where $E_\omega$ and $E_{2\omega}$ are the electric fields fundamental and second harmonic beams used during conditioning, $\kappa$ is the low frequency dielectric constant and $a$ is a parameter related to third-order nonlinearity. This relation applies generally to photo-induced second harmonic generation. The parameter $a$ for each dopant for generating second harmonics is resonantly enhanced when the frequency of one of the writing beams, $\omega$ or $2\omega$, is close to an optical transition in the material.

It is to be understood that the above described embodiments are illustrative of only a few of the many possible specific embodiments which can represent applications of the principles of the invention. For example, while the invention has been described in relation to thulium-doped glass, it is equally applicable to glass doped with other second harmonic generating dopants including germanium, tantalum, erbium, ytterbium, europium, and cerium. Thus numerous and other arrangements can be made by those skilled in the art without departing from the spirit and scope of the invention.

We claim:

1. In an optical second harmonic generating device of the type comprising an optical input source of light at a frequency $\omega$, a waveguiding doped glass body for receiving light from said source, said body doped with material for generating a second harmonic light of frequency $2\omega$, the improvement wherein:

the doping material has an optical transition resonance band and the frequency $\omega$ of the light source is chosen so that either $\omega$ or $2\omega$ lies within twice the half peak bandwidth of said resonance band.

2. The improved device of claim 1 wherein said doping material is selected from the group consisting of germanium, tantalum, erbium, thulium, ytterbium, europium and cerium.

3. The improved device of claim 1 wherein said waveguiding glass body is an optical fiber.

4. The improved device of claim 1 wherein said doping material is thulium.

5. A source of light of a desired frequency $2\omega$ comprising:

a waveguiding body of glass doped with thulium; and an optical input source of light at frequency $\omega$ for directing an input beam into said body.

6. The source of claim 5 wherein said glass is aluminosilicate glass.

7. The source of claim 5 wherein said body of glass is an optical fiber.

8. The source of claim 5 wherein said optical input source is a laser.

* * * * *